(No Model.)

J. A. HOLMES & G. TESKE.
BAKING OVEN.

No. 463,193. Patented Nov. 17, 1891.

Witnesses.

Inventors.
John A. Holmes
Gustav Teske
By C. T. Benedict
Attorney.

UNITED STATES PATENT OFFICE.

JOHN A. HOLMES AND GUSTAV TESKE, OF MILWAUKEE, WISCONSIN, ASSIGNORS OF THREE-FIFTHS TO ROBERT A. JOHNSTON, OF SAME PLACE.

BAKING-OVEN.

SPECIFICATION forming part of Letters Patent No. 463,193, dated November 17, 1891.

Application filed April 6, 1891. Serial No. 387,816. (No model.)

*To all whom it may concern:*

Be it known that we, JOHN A. HOLMES and GUSTAV TESKE, of Milwaukee, in the county of Milwaukee and State of Wisconsin, have invented a new and useful Improvement in Baking-Ovens, of which the following is a description, reference being had to the accompanying drawings, which are a part of this specification.

This invention relates to improvements in that class of baking-ovens which are used in large bakeries and are adapted for baking bread, biscuits, or crackers, cake, &c. Heretofore ovens have been used in which heated air with mingled steam were employed for baking the material, but by reason of the ill-advised and improperly-constructed oven the use of steam therein has not been entirely successful.

The object of our invention is to provide an oven of proper form and construction and therewith to provide steam-pipes located, constructed, and arranged to so discharge a limited and regulated supply of clean wholesome steam into the oven at a proper location and in a proper manner to satisfactorily mingle with the air and so surround and affect the material being baked as to produce the desired results thereon.

Figure 1:
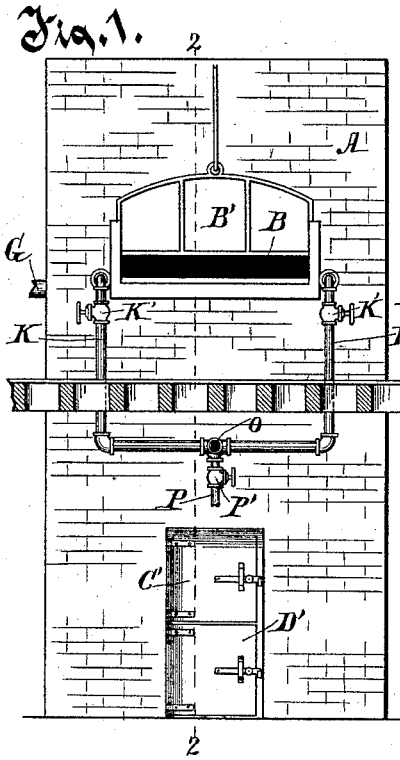
Figure 2:
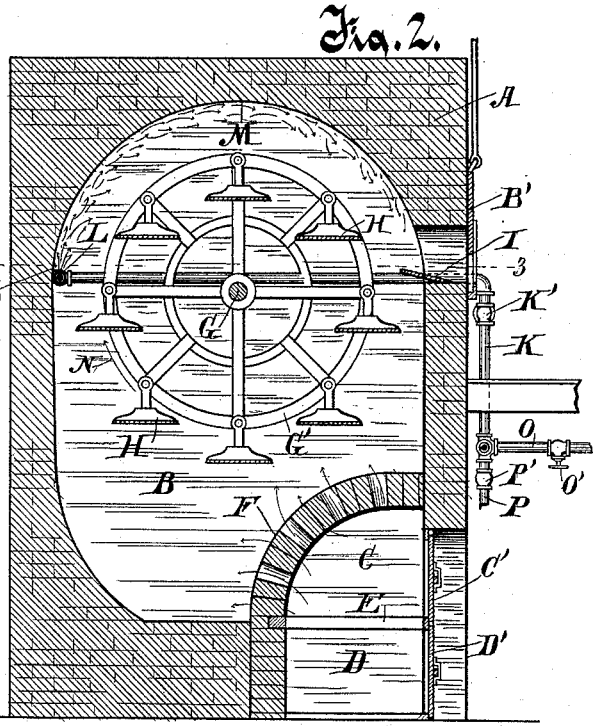
Figure 3:
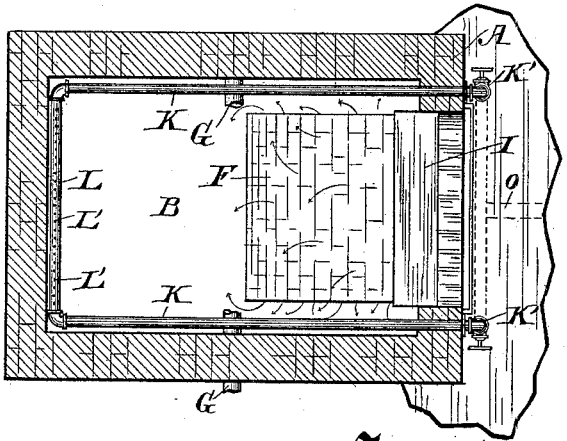

In the drawings, Figure 1 is a front elevation of a baker's oven in which our improved devices are used. Fig. 2 is a longitudinal vertical section of the oven on line 2 2 of Fig. 1. Fig. 3 is a horizontal section on line 3 3 of Fig. 2, portions of the interior mechanism being omitted for better exhibition of the parts desired to be shown.

The oven is desirably constructed of brick walls A, forming an oven-chamber B, a combustion-chamber C, and an ash-pit D. These several chambers are provided with mouths closed by doors B', C', and D', respectively. A grate E separates the ash-pit from the combustion-chamber and serves to support the fuel for combustion thereon. A wall F, provided with flues or passages therethrough, separates the combustion-chamber from the oven-chamber. The passages through the wall F permit the heated air with the gases and smoke to pass into the oven-chamber, and the smoke and gases pass off through a chimney provided therefor, which may be located at the rear or at the sides of the oven-chamber, which, as such chimney is common in connection with ovens, is not shown in the drawings, as it forms no part of our invention.

A shaft G, passing transversely and about centrally through the oven, carries thereon a fixed skeleton wheel G', on which are supported pendent therefrom a series of shelves H, which are pivoted to the wheel and by their gravity hang horizontally thereon at all points of the revolution of the wheel. These shelves are adapted to receive pans containing dough in the form of biscuits, bread, or cake to be baked, which pans are put into the oven through the doorway or mouth normally closed by the door B', the pans for that purpose being pushed in over the apron I, fixed in the mouth of the oven, the pans being placed on and removed from the shelves as they severally come opposite the apron, at which point for that purpose the wheel is stopped in its rotation by the attendant. The wheel revolves in the direction indicated by the arrow N, so that the pans on the wheel are carried first downwardly toward the combustion-chamber and then rearwardly and upwardly over to the front near the top of the oven.

For properly modifying the heated air in the oven and for bringing a limited supply of steam into contact with the material being baked in the upper part of the oven and while it is passing through the latter stages of being baked and so as, among other things, to prevent a too hard and dry crust being formed on the articles being baked, we introduce steam into the oven through the pipes K, which run to the rear of the oven and are connected by a cross-pipe L, provided with a series of apertures L'. This pipe L is located near the rear wall of the oven and about opposite or a little above the shaft of the wheel, and the apertures L' therein are arranged to discharge steam therefrom upwardly into the top of the oven-chamber and preferably against the arched wall M of the chamber, but not directly against the shelves H, nor the material being supported thereon.

The steam-pipes K lead into the oven from the steam-supply pipe O, preferably located at a little distance below those parts of the pipes K that enter the oven, and a branch waste-pipe P leads downwardly from the pipe O conveniently at its junction with the pipes K, which is adapted when open to carry off the water of condensation and any sediment or foreign matter that may have entered the steam-pipes, thus providing for supplying the oven with clean and pure steam. The several steam-pipes are provided with steam-cocks K', O', and P', respectively.

What we claim as new, and desire to secure by Letters Patent, is—

1. The combination, with suitable walls forming the oven-chamber and a wheel carrying shelves revolving therein, of a steam-pipe leading into the chamber and located near the rear wall, and apertures in the pipe arranged to discharge the steam into the upper portion of the chamber, but not directly against the shelves on the wheel or the material thereon, substantially as described.

2. In a baker's oven constructed with a wall having an arched roof and a wheel carrying shelves revolving therein, a system of steam-pipes, consisting of a supply-pipe, as O, a waste-pipe, as P, an oven-pipe, as K, located somewhat above the supply-pipe O, a discharging-pipe L, having apertures L' therein, arranged to discharge steam into the upper part of the oven and not directly against or upon the shelves on the wheel, all combined substantially as described.

3. The combination, with an oven having a door at the front for admitting therethrough the material to be baked, of a wheel in the oven having shelves adapted to receive and support the material while being baked, which shelves are arranged to move down at the front and up at the rear as the wheel is revolved, whereby material placed on them at the front of the oven through the door is carried first into the lower part of the oven and afterward into the upper part of the oven by the single revolution of the wheel, during which the material remains on the shelves, and a steam-pipe leading into the oven at the rear of the wheel and at or above the horizontal plane of its axis, which pipe is provided with apertures arranged to discharge steam into the oven upwardly only and not directly against the material on the shelves, substantially as described.

In testimony whereof we affix our signatures in presence of two witnesses.

JOHN A. HOLMES.
GUSTAV TESKE.

Witnesses:
C. T. BENEDICT,
ANNA V. FAUST.